(12) United States Patent
Berthereau et al.

(10) Patent No.: US 9,932,263 B2
(45) Date of Patent: Apr. 3, 2018

(54) GLASS COMPOSITION HAVING IMPROVED HYDRAULIC RESISTANCE FOR THE MANUFACTURE OF GLASS REINFORCING STRANDS

(71) Applicant: OCV Intellectual Capital, LLC, Toledo, OH (US)

(72) Inventors: Anne Berthereau, Columbus, OH (US); Jerome Lalande, Saint-Maur des Fosses (FR)

(73) Assignee: OCV Intellectual Capital, LLC, Toledo, OH (US)

( * ) Notice: Subject to any disclaimer, the term of this patent is extended or adjusted under 35 U.S.C. 154(b) by 727 days.

(21) Appl. No.: 13/973,124

(22) Filed: Aug. 22, 2013

(65) Prior Publication Data

US 2013/0333594 A1 Dec. 19, 2013

Related U.S. Application Data

(62) Division of application No. 12/446,778, filed as application No. PCT/FR2007/052241 on Oct. 25, 2007, now Pat. No. 9,212,086.

(30) Foreign Application Priority Data

Oct. 25, 2006 (FR) ...................... 06 54053

(51) Int. Cl.
*C03C 13/00* (2006.01)
*C08K 7/14* (2006.01)
*C03C 3/078* (2006.01)
*C03C 4/20* (2006.01)

(52) U.S. Cl.
CPC ............ *C03C 13/00* (2013.01); *C03C 3/078* (2013.01); *C03C 4/20* (2013.01); *C03C 13/002* (2013.01); *C08K 7/14* (2013.01)

(58) Field of Classification Search
CPC ........... C03C 3/078; C03C 4/20; C03C 13/00; C03C 13/002; C08K 7/14
See application file for complete search history.

(56) References Cited

U.S. PATENT DOCUMENTS

| | | | |
|---|---|---|---|
| 2,640,784 A | 6/1953 | Tiede et al. | |
| 2,877,124 A | 3/1959 | Welsch | |
| 3,861,926 A | 1/1975 | Irlam et al. | |
| 3,973,974 A | 8/1976 | Ohtomo et al. | |
| 4,014,705 A | 3/1977 | Yale | |
| 4,054,472 A * | 10/1977 | Kondo | C03C 3/076 106/711 |
| 4,062,689 A | 12/1977 | Suzuki et al. | |
| 4,065,317 A | 12/1977 | Baak et al. | |
| 4,066,465 A | 1/1978 | Mohri et al. | |
| 4,140,533 A | 2/1979 | Ohtomo et al. | |
| 4,189,422 A * | 2/1980 | Wakeford | C08K 3/22 260/DIG. 24 |
| 4,234,342 A * | 11/1980 | Wakasa | C03C 13/002 106/711 |
| 4,260,538 A * | 4/1981 | Iseler | C08G 18/68 523/527 |
| 4,345,037 A | 8/1982 | Fyles | |
| 5,064,785 A | 11/1991 | Kawamoto et al. | |
| 6,627,569 B1 | 9/2003 | Naumann et al. | |
| 6,630,420 B1 | 10/2003 | Naumann et al. | |
| 6,773,500 B1 | 8/2004 | Creamer | |
| 7,273,668 B2 | 9/2007 | Kurachi et al. | |
| 7,629,279 B2 * | 12/2009 | Tanaka | C03C 13/00 501/35 |
| 2005/0003136 A1 | 1/2005 | Kurachi et al. | |
| 2005/0147816 A1 | 7/2005 | Dallies et al. | |
| 2009/0305053 A1 | 12/2009 | Lecomte et al. | |
| 2010/0152333 A1 | 6/2010 | Berthereau et al. | |
| 2013/0333594 A1 | 12/2013 | Berthereau | |

FOREIGN PATENT DOCUMENTS

| | | |
|---|---|---|
| CN | 1046147 | 10/1990 |
| CN | 1149031 | 5/1997 |
| CN | 1500763 | 6/2004 |
| DE | 2656002 | 6/1978 |
| DE | 293105 | 8/1991 |

(Continued)

OTHER PUBLICATIONS

Office action from U.S. Appl. No. 12/091,615 dated May 21, 2014.
Interview Summary from U.S. Appl. No. 12/446,778 dated Apr. 22, 2015.
Office action from European Application No. 07866485.1 dated Apr. 4, 2014, 5 pgs.
Office action from Mexican Application No. 09/04482 dated Jul. 17, 2014 along with English translation of relevant portions of action.
Office action from European Application No. 07866485.1 dated Sep. 12, 2014.
Office action from U.S. Appl. No. 12/091,615 dated Jul. 29, 2015.
Office action from Indian Application No. 1529/KOLNP/2009 dated Mar. 26, 2014, received on Jun. 19, 2014.
International Search Report and Written Opinion from PCT/FR2006/051085 dated Apr. 29, 2008.
International Search Report and Written Opinion from PCT/FR07/052241 dated Apr. 9, 2008.
Office action from U.S. Appl. No. 12/091,615 dated Jun. 18, 2013.
Office action from U.S. Appl. No. 12/091,615 dated Oct. 6, 2011.

(Continued)

*Primary Examiner* — Karuna P Reddy
(74) *Attorney, Agent, or Firm* — Calfee, Halter & Griswold LLP

(57) ABSTRACT

The present invention relates to a chemically resistant glass composition for the production of reinforcing strands which comprises the following constituents within the limits defined below, expressed in mol %: $SiO_2$ 67-72%; $ZrO_2$ 5-9.5%, preferably ≥7.5%; $R_2O$ (R=Na, K and Li) 11-17%; $Li_2O$ 0-5.5%; $K_2O$ 0-5.5%; $Na_2O$<10%; and CaO 3-9%, the composition furthermore containing less 1% of impurities ($Al_2O_3$, $Fe_2O_3$, $Cr_2O_3$, $TiO_2$, MgO, SrO, BaO and $P_2O_5$) and being free of F. It also relates to the glass strands obtained from this composition and to the composites based on an organic or inorganic material containing such strands.

14 Claims, No Drawings

(56) References Cited

FOREIGN PATENT DOCUMENTS

| | | |
|---|---|---|
| EP | 500325 | 8/1992 |
| FR | 2451347 | 10/1980 |
| FR | 2651223 | 3/1991 |
| FR | 2809389 | 11/2001 |
| FR | 2837818 | 10/2003 |
| FR | 2864972 | 7/2005 |
| GB | 965018 | 7/1964 |
| GB | 1290528 | 9/1972 |
| GB | 2009141 | 6/1979 |
| GB | 2071081 | 9/1981 |
| JP | 55-140735 | 11/1980 |
| JP | 56-134534 | 10/1981 |
| JP | 58-088138 | 5/1983 |
| JP | 61-236633 | 10/1986 |
| JP | 62-292839 | 12/1987 |
| JP | 63-107556 | 5/1988 |
| JP | 3-080130 | 4/1991 |
| JP | 5-085767 | 4/1993 |
| JP | 9-156957 | 6/1997 |
| JP | 11-292562 | 10/1999 |
| JP | 2000-072519 | 3/2000 |
| JP | 2000-186787 | 7/2000 |
| JP | 2002-060252 | 2/2002 |
| JP | 2003-002696 | 1/2003 |
| SU | 1512938 | 10/1989 |
| WO | 92/06931 | 4/1992 |
| WO | 01/90017 | 11/2001 |
| WO | 2004/035497 | 4/2004 |
| WO | 2005/071152 | 8/2005 |
| WO | 2006/090030 | 8/2006 |
| WO | 2007/048965 | 5/2007 |
| WO | 2008/050069 | 5/2008 |

OTHER PUBLICATIONS

Office action from U.S. Appl. No. 12/091,615 dated Mar. 15, 2012.
Office action from U.S. Appl. No. 12/091,615 dated Feb. 1, 2013.
Office action from U.S. Appl. No. 12/446,778 dated Jun. 28, 2012.
Office action from U.S. Appl. No. 12/446,778 dated Jan. 7, 2013.
Notice of Allowance from U.S. Appl. No. 12/446,778 dated May 22, 2013.
Office action from Chinese Application No. 200680044186.4 dated Nov. 20, 2009.
Office action from Chinese Application No. 200780039750.8 dated Aug. 4, 2010.
Office action from Chinese Application No. 200780039750.8 dated Apr. 20, 2011.
Office action from Chinese Application No. 200780039750.8 dated Oct. 19, 2011.
Search Report from French Patent No. 553,288 dated Oct. 12, 2006.
Office action from Japanese Application No. 2008-537155 dated Aug. 20, 2012.
Third Party Objections from Japanese Application No. 2008-537155 dated Feb. 22, 2012.
Office action from Japanese Application No. 2009-533917 dated Sep. 24, 2012.
Office action from Russian Application No. 2009119558 dated Oct. 7, 2011.
Tekhnologia Stekla (Glass technology), under the editorship of I.II. Kitalgorodsky, Moscow, Stroyizdat, 1961, pp. 43-44.
Office action from Mexican Application No. 09/04482 dated Oct. 25, 2013 received on Jan. 7, 2014 along with English translation of relevant portions of action.
Notice of Allowance U.S. Appl. No. 12/446,778 dated Aug. 11, 2015.
Office action from U.S. Appl. No. 12/091,615 dated Dec. 18, 2014.
Office action from U.S. Appl. No. 12/446,778 dated Dec. 18, 2014.
Office action from U.S. Appl. No. 12/091,615 dated May 5, 2016.
Office action from Indian Application No. 1949/KOLNP/2008 dated Jun. 23, 2016.
Interview Summary from U.S. Appl. No. 12/091,615 dated Sep. 2, 2016.
Office action from U.S. Appl. No. 12/091,615 dated Jan. 3, 2017.
Notice of Allowance from U.S. Appl. No. 12/091,615 dated Jun. 26, 2017.

* cited by examiner

GLASS COMPOSITION HAVING IMPROVED HYDRAULIC RESISTANCE FOR THE MANUFACTURE OF GLASS REINFORCING STRANDS

RELATED APPLICATIONS

This application is a divisional application of U.S. Pat. No. 9,212,086, filed Feb. 9, 2010, titled GLASS COMPOSITION HAVING IMPROVED HYDROLYTIC RESISTANCE FOR THE MANUFACTURE OF GLASS REINFORCING STRANDS, which is the U.S. national phase entry of PCT/FR07/52241, with an international filing date of Oct. 25, 2007, which claims priority and all other benefits of French Application Ser. No. 0654053, filed Oct. 25, 2006, the entire disclosures of which are incorporated herein by reference.

The invention relates to a chemically resistant glass composition, in particular one having a high hydrolytic resistance, for the production of glass reinforcing strands, and to the organic and Inorganic products (or composites) containing such strands.

It has been known for a long time to use glass strands to reinforce organic and inorganic materials so as to give them better mechanical properties. Usually, the strands consist of a glass with the composition $SiO_2$—$Al_2O_3$—$CaO$—$B_2O_3$ (called E-glass) that exhibits excellent hydrolytic and thermal resistance. However, this type of glass is not suitable for use in an alkaline medium, or in an acid medium.

One means of improving the alkaline resistance consists in incorporating zirconium oxide $ZrO_2$ into the glass composition. For example, it is known to use glass with a high $ZrO_2$ content to reinforce cements, the basic character of which is very pronounced (pH possibly ranging up to 12.5).

Numerous patents disclose glass compositions having a high $ZrO_2$ content.

EP 0500325 A1 describes compositions for chemically resistant glass fibers that can be used as reinforcements in cement or in plastics. The compositions have, in mol %, a $TiO_2$ content of 5 to 18%, a $TiO_2$+$ZrO_2$ content of between 12 and 25%, a BaO content of 4 to 15% and an MgO, CaO, SrO, BaO and ZnO content of between 12 and 35%.

JP 9156957 describes fiber made of glass resistant to alkalis, to acids and to water, which comprises 5 to 9 mol % $TiO_2$ and possesses a $TiO_2$ and $ZrO_2$ content of between 13 and 17 mol %.

U.S. Pat. No. 5,064,785 B discloses an alkaline-resistant glass composition for glass fibers, which contains 10 to 17 wt % $Na_2O$ and 0.5 to 7 wt % $TiO_2$.

JP 2000-186787 A describes a pipe (or tube) made of resin reinforced by fibers of glass resistant to alkalis and to acids, which contains 10 to 17 wt % $Na_2O$.

WO 2004/035497 A1 describes fibers consisting of a glass composition comprising, in mol %, 50 to 60% $SiO_2$, 0.5 to 20% $TiO_2$, 20 to 45% MgO, CaO, SrO and BaO and 0 to 2% $Li_2O$, $Na_2O$ and $K_2O$, and having a BaO/CaO molar ratio between 0.3 and 16.

U.S. Pat. No. 6,627,569 B and U.S. Pat. No. 6,630,420 B disclose glass compositions containing, in wt %, 0.5 to 7% $A_2O_3$, less than 10% $Na_2O$ and $K_2O$ and more than 0.1% $TiO_2$ or more than 0.6% $La_2O_3$.

CN 1046147 A describes fiber made of alkaline-resistant glass comprising 11 to 14 wt % $ZrO_2$ and 1 to 5.5 wt % $TiO_2$.

CN 1149031 A describes fiber made of alkaline-resistant glass containing 0.1 to 10 wt % $TiO_2$ and 0.1 to 5 wt % $CaF_2$.

U.S. Pat. No. 4,014,705 B discloses continuous fibers made of alkaline-resistant glass containing 3 to 9 mol % $F_2$.

Apart from their alkaline resistance, glasses having a high $ZrO_2$ content generally exhibit good acid resistance.

Strands consisting of a glass having a high proportion of $ZrO_2$ that can be used to reinforce cement are sold under the trademark Cem-FIL® They may also be used to reinforce polymer matrices, particularly polyester and vinyl ester polymers, in composites intended for being in contact with acid media (WO 2006/090030 A1).

One drawback of the aforementioned glass strands is their hydrolytic sensitivity. The Applicant has in fact found that the materials and composites reinforced by these strands lose their mechanical strength when aged in a wet medium, in particular at high temperatures. In the case of composites with a polymer matrix, the glass strands no longer adhere properly to the matrix, this being manifested by whitening of the composite. Without wishing to be tied down by any particular theory, it seems that the whitening is due to exchange between the $Na^+$ ions present on the surface of the glass and the protons contained in the aqueous medium. This causes degradation of the surface structure of the glass and, subsidiarily, a local increase in the proportion of $OH^-$ ions that favors rupture of the chemical bonds between the glass and the matrix. The amount of whitening is directly linked to the amount of $Na_2O$ in the glass composition.

It is the object of the present invention to provide a chemically resistant glass composition which has in particular an improved hydrolytic resistance, while still maintaining good resistance to acids and alkalis, and which may be processed under the usual conditions in existing fiberizing installations.

This object is achieved thanks to a chemically resistant glass composition for the production of strands, this composition being characterized in that it comprises the following constituents within the limits defined below, expressed in mol %:

| | |
|---|---|
| $SiO_2$ | 67-72% |
| $ZrO_2$ | 5-9.5%, preferably ≥7.5% |
| $R_2O$ (R = Na, K and Li) | 11-17% |
| $Li_2O$ | 0-5.5% |
| $K_2O$ | 0-5.5% |
| $Na_2O$ | <10% |
| CaO | 3-9%, | the composition furthermore containing less than 1% of impurities ($Al_2O_3$, $Fe_2O_3$, $Cr_2O_3$, $TiO_2$, MgO, SrO, BaO and $P_2O_5$) and being free of F.

According to one feature of the invention, the glass composition satisfies the following relationship:

$$2.5\% \leq Na_2O + K_2O - CaO \leq 9.5\%,$$

thereby making it possible to guarantee that the fiberizing takes place under satisfactory conditions, that is to say that the difference between the strand forming temperature ($T_{log\ n=3}$) and the liquidus temperature ($T_{liq}$) is at least +10° C. Preferably, the difference is at least +30° C. and advantageously at least +60° C.

Furthermore, the forming temperature is at most 1320° C. and is preferably 1300° C. or below, this corresponding to a temperature that is very acceptable as it does not require the glass to be excessively heated and makes it possible to minimize bushing wear.

The preferred glass composition according to the invention comprises the following constituents (in mol %):

| | |
|---|---|
| $SiO_2$ | 67-72% |
| $ZrO_2$ | 5-9.5%, preferably ≥7.5% |
| $R_2O$ (R = Na, K and Li) | 11-17% |
| $Li_2O$ | 0-5.5% |
| $K_2O$ | 2.5-5.5% |
| $Na_2O$ | 5-<10% |
| CaO | 3-9%, | the composition furthermore containing less than 1% of impurities ($Al_2O_3$, $Fe_2O_3$, $Cr_2O_3$ and $P_2O_5$) and being free of F, $TiO_2$, MgO, SrO and BaO.

The particularly preferred glass composition according to the invention comprises the following constituents (in mol %):

| | |
|---|---|
| $SiO_2$ | 67-72% |
| $ZrO_2$ | 5-8.5%, preferably ≥7.5% |
| $R_2O$ (R = Na, K and Li) | 11-17% |
| $Li_2O$ | 1.5-5.5% |
| $K_2O$ | 2.5-5.5% |
| $Na_2O$ | 5-<10% |
| CaO | 3-9%, | the composition furthermore containing less than 1% of impurities ($Al_2O_3$, $Fe_2O_3$, $Cr_2O_3$ and $P_2O_5$) and being free of F, $TiO_2$, MgO, SrO and BaO.

According to yet another feature of the invention, the CaO content in the glass composition varies from 3 to 8.5%.

$SiO_2$ is the oxide that forms the network of the glass according to the Invention and plays an essential role in stabilizing it. Within the context of the invention, when the $SiO_2$ content is less than 67%, the viscosity of the glass becomes too low and there is a greater risk of the glass devitrifying during fiberizing. In general, the $SiO_2$ content is kept at 72% or below, as above this value the glass becomes too viscous and difficult to melt. Preferably, the $SiO_2$ content varies from 68 to 71.5%. Furthermore, $SiO_2$ contributes to improving the resistance in a neutral or acid medium.

$ZrO_2$ is essential for giving the glass alkaline resistance, and its content is consequently at least about 5%, preferably 7.5% or higher. Furthermore, $ZrO_2$ helps to improve the acid resistance. A $ZrO_2$ content greater than 9.5% increases the risk of devitrification during fiberizing and degrades the fusibility.

$Na_2O$, $K_2O$ and $Li_2O$ are used as fluxing agents to lower the viscosity of the glass and to allow better dissolution of the $ZrO_2$ during the melting of the glass batch.

$Na_2O$ has a deleterious effect on the hydrolytic resistance of the glass and consequently its content is limited to a value of 10% or less, but preferably greater than 5%, again to maintain satisfactory melting and fiberizing conditions.

The $Li_2O$ and $K_2O$ contents are preferably less than 5.5% so as to maintain an acceptable liquidus temperature and to minimize the cost of the glass ($Li_2O$-based and $K_2O$-based raw materials are generally carbonates, which are costly).

A $K_2O$ content of greater than 2.5% is preferred.

Preferably, the glass composition contains $Li_2O$ and $K_2O$, thereby reducing the leaching of alkaline metals (Na, K and/or Li) when the glass is in contact with an aqueous medium. An advantageous level of leaching is obtained when the $Li_2O$ content is greater than 1.5%, preferably around 2%.

According to one advantageous feature of the invention, the $Li_2O/R_2O$ and $K_2O/R_2O$ molar ratios are equal to 0.5 or less. Preferably, $LiO_2/R_2O$ is 0.35 or less and $K_2O/R_2O$ is 0.30 or less.

According to the invention, the $R_2O$ content, that is to say the sum of the $Na_2O$, $K_2O$ and $Li_2O$ contents, is 11% or more and preferably less than 17% so as to have satisfactory melting and fiberizing conditions.

CaO allows the viscosity of the glass to be adjusted and the devitrification to be controlled. The CaO content varies between 3 and 9% so as to maintain an acceptable liquidus temperature, as a general rule below 1280° C., preferably below 1260° C. and advantageously 1220° C. or below. Preferably, the CaO content is less than 8.5%. CaO contributes to improving the hydrolytic resistance of the glass compositions according to the invention.

The glass composition according to the invention may contain up to 1% of unavoidable impurities introduced by the batch materials used to produce the glass and/or coming from the refractories of the furnace. The impurities consist of $Al_2O_3$, ion oxides (expressed in $Fe_2O_3$ form), $Cr_2O_3$, $TiO_2$, MgO, SrO, BaO and $P_2O_5$. The $Al_2O_3$ content is generally less than 0.5%. Preferably, the $Fe_2O_3$ content does not exceed 0.5% so as not to unacceptably impair the color of the glass strands and the operation of the fiberizing installation, in particular the heat transfer in the furnace. Also preferably, the $Cr_2O_3$ content is less than 0.05% and better still it is zero. Advantageously, the content of each oxide, $TiO_2$, MgO, SrO and BaO, is less than 0.5%.

As a general rule, the glass composition contains no $TiO_2$, MgO, SrO and BaO.

The glass composition is free of F. The presence of fluorine is proscribed because of the risk of polluting emissions and of an exothermic reaction with $Li_2O$, which may occur during melting, and problems of the refractory elements of the furnace corroding.

The glass strands are obtained from the glass composition described above using the following fiberizing process: a multiplicity of molten glass streams, flowing out from a multiplicity of holes placed in the base of one or more bushings, are attenuated in the form of one or more sheets of continuous filaments and then the filaments are gathered together into one or more strands that are collected on a moving support. This may be a rotating support when the strands are collected in the form of wound packages, or in the form of a support that moves translationally when the strands are chopped by a device that also serves to draw them or when the strands are sprayed by a device serving to draw them, so as to form a mat.

The strands obtained, optionally after further conversion operations, may thus be in various forms: reinforcing fibers, continuous strands, chopped strands, woven fabrics, knitted fabrics, braids, tapes or mats, these strands being composed of filaments having a diameter that may range from about 5 to 30 microns.

The molten glass feeding the bushings is obtained from pure raw materials or, more usually, natural raw materials (that is to say possibly containing trace impurities), these raw materials being mixed in appropriate proportions, and then melted. The temperature of the molten glass is conventionally regulated so as to allow the glass to be fiberized and to avoid devitrification problems. Before the filaments are combined in the form of strands, they are generally coated with a size composition with the aim of protecting them from abrasion and allowing them to be subsequently incorporated into the materials to be reinforced. The size composition may be an aqueous or anhydrous composition (containing less than 5% solvent by weight), for example the composition described in WO 01/90017 A and FR 2837818 A. Where appropriate, before and/or after collection, the strands may undergo a heat treatment for the purpose of drying them and/or of curing the size.

The glass strands obtained may thus be used to reinforce a matrix material, including inorganic materials, such as cementitious materials, and organic materials, particularly plastics.

The inorganic materials that can be reinforced are especially cementitious materials, such as cement, concrete, mortar, gypsum, slag and compounds formed by the reaction between lime, silica and water, and mixtures of these materials with other materials, for example mixtures of cement, polymers and fillers (coatings).

The reinforcement may be carried out directly by incorporating the glass strands into the cementitious material, or indirectly using glass strands combined beforehand with an organic material, for example to form composite elements that can be used as rebars for reinforced concrete.

The organic materials that can be reinforced by the glass strands according to the invention are thermoplastics or thermosets, preferably thermosets.

As examples of thermoplastics, mention may be made of polyolefins, such as polyethylene, polypropylene and polybutylene, polyesters, such as polyethylene terephthalate and polybutylene terephthalate, polyamides, polyurethanes and blends of these compounds.

As examples of thermosets, mention may be made of polyesters, for example vinyl ester resins, phenolic resins, epoxy resins, polyacrylics and blends of these compounds. Vinyl ester resins, particularly of the isophthalic type are preferred as they have better corrosion resistance.

As already indicated above, it is possible to use the glass strands in the form of continuous strands (for example in the form of cakes or rovings, meshes, fabrics, etc.) or chopped strands (for example in the form of nonwovens, such as veils or mats), and their presentation depends on the nature of the material to be reinforced and on the process employed.

Continuous glass strands according to the invention may thus be used for manufacture of hollow bodies, such as pipes or tanks using the known technique of filament winding, which consists in depositing a reinforcement, for example a layer of roving impregnated with organic material, on a mandrel rotating about its axis. Such hollow bodies are intended in particular for collecting and discharging wastewater (as pipes) and for storing or transporting chemicals (as tanks and containers). As regards chopped strands, these are suitable for reinforcing paints or mastics and for producing composites by contact molding.

Wound packages of strands may be used for producing meshes or fabrics used as crack-resistant or earthquake-resistant elements in cementitious materials, or for repairing civil engineering works (bridges, tunnels, roads, etc.). The packages may also be used for manufacturing composite sections by pultrusion, that is to say by passing a reinforcement impregnated with organic material through a heated die. These composite sections are used in particular as construction elements in industries where the materials must have a high resistance to alkalis and acids, for example in the chemical, oil and harbor industries.

The glass strands are generally incorporated into the inorganic or organic material to be reinforced in an amount such that the glass represents 16 to 80% by volume, preferably 20 to 60% by volume, of the final material.

In the final composite, the glass strands may be the only elements for reinforcing the inorganic or organic material, or they may be combined with other elements, such as metal wires and/or mineral, especial ceramic, strands.

The glass composition according to the invention makes it possible to produce glass strands having a better hydrolytic resistance than the known strands for reinforcing organic or inorganic materials, and can be inexpensively fiberized in conventional installations without the operating conditions being modified.

Furthermore, it has been found that these glass strands exhibit good dielectric properties, especially a dielectric constant $\in'$ of less than 8 at 1 MHz and less than 6.5 at 10 GHz, and dielectric losses $\in''$ of less than 0.0500 at 1 MHz and less than 0.1250 at 10 GHz.

The examples that follow allow the invention to be illustrated without however limiting it.

a) Production of the Glass

Glass was prepared by melting the compositions given in Table 1, expressed in mol %.

The density, Young's modulus, dielectric constant $\in'$ and dielectric losses $\in''$ at 1 MHz and 10 GHz (Table 1) were measured on this glass when cut and polished.

b) Production of the Strands

Glass strands 10 μm in diameter were formed by attenuating molten glass streams obtained under a) flowing from a platinum bushing and collected in the form of a bobbin.

The hydrolytic resistance was measured on the glass strand under the following conditions: 60 mg of strand extracted from the above bobbin were placed in a container holding 9 ml of ultrapure water, the container was then hermetically sealed and placed in a bath thermostated at 80° C. for 48 hours. The test was carried out on five specimens of the same strand. At the same time, three controls each containing only 9 ml of ultrapure water were produced.

The content of the five specimens containing the glass strand (solution S1) and of the three controls (solution S2) were collected and the amount of alkali metal elements in the solutions was measured by inductively coupled plasma (ICP) emission spectroscopy in the case of Na and K and by atomic emission spectroscopy (AES) in the case of Li. The resulting alkali metal content due to leaching from the glass (corresponding to the difference in contents in S1 and 82), expressed in mol/m$^3$, is given in Table 1 below.

TABLE 1

| | EXAMPLE | | | | | | | | |
|---|---|---|---|---|---|---|---|---|---|
| | 1 | 2 | 3 | 4 | 5 | 6 | 7 | 8 | 9 |
| $SiO_2$ | 68.2 | 71.5 | 70.5 | 69.3 | 69.9 | 70.7 | 69.2 | 69.1 | 70.1 |
| $Li_2O$ | 3.9 | 5.2 | 4.4 | 2.0 | 2.9 | 3.9 | 2.0 | 2.2 | 2.2 |
| $Na_2O$ | 7.9 | 6.3 | 5.6 | 9.8 | 9.8 | 7.9 | 8.8 | 8.0 | 8.0 |
| $K_2O$ | 3.9 | 4.2 | 3.7 | 3.9 | 2.9 | 3.9 | 3.9 | 3.5 | 3.5 |
| CaO | 6.8 | 3.5 | 6.5 | 5.7 | 5.2 | 4.3 | 6.9 | 8.0 | 8.0 |
| $ZrO_2$ | 8.9 | 8.9 | 8.9 | 8.9 | 8.9 | 8.9 | 8.9 | 8.9 | 7.9 |
| $R_2O$ | 15.7 | 15.7 | 13.7 | 15.7 | 15.6 | 15.7 | 14.7 | 13.7 | 13.7 |
| $Na_2O + K_2O - CaO$ | 5 | 7 | 2.8 | 8.0 | 7.5 | 7.5 | 5.8 | 3.5 | 3.5 |
| $Li_2O/R_2O$ | 0.248 | 0.330 | 0.321 | 0.127 | 0.185 | 0.248 | 0.136 | 0.160 | 0.160 |

TABLE 1-continued

| | | | | | | | | | |
|---|---|---|---|---|---|---|---|---|---|
| $K_2O/R_2O$ | 0.248 | 0.267 | 0.270 | 0.248 | 0.185 | 0.248 | 0.265 | 0.255 | 0.255 |
| $T_{log\eta=3}$ (° C.) | 1251 | 1295 | 1293 | 1292 | 1289 | 1291 | 1286 | 1288 | 1286 |
| $T_{liq}$ (° C.) | 1190 | 1200 | 1280 | 1110 | 1150 | 1150 | 1150 | 1240 | n.d. |
| $T_{log\eta=3} - T_{liq}$ (° C.) | 61 | 95 | 13 | 182 | 139 | 141 | 136 | 48 | n.d. |
| Properties of the glass | | | | | | | | | |
| Density | 2.73 | 2.69 | 2.65 | 2.72 | 2.71 | 2.70 | 2.73 | 2.74 | n.d. |
| Young's modulus (GPa) | 88.6 | 88.5 | n.d. | 86.8 | 88.1 | 87.8 | 87.1 | 88.3 | n.d. |
| ε' at 1 MHz | n.d. | n.d. | n.d. | 7.84 | n.d. | 7.61 | n.d. | n.d. | n.d. |
| at 10 GHz | n.d. | n.d. | n.d. | 6.34 | n.d. | 6.27 | n.d. | n.d. | n.d. |
| ε" at 1 MHz | n.d. | n.d. | n.d. | 0.0409 | n.d. | 0.0363 | n.d. | n.d. | n.d. |
| at 10 GHz | n.d. | n.d. | n.d. | 0.1125 | n.d. | 0.0990 | n.d. | n.d. | n.d. |
| Hydrolytic resistance | | | | | | | | | |
| Na (mol/m³) | 0.24 | 0.28 | 0.21 | 0.38 | 0.49 | 0.33 | 0.21 | 0.13 | 0.20 |
| Na + Li + K (mol/m³) | 0.38 | 0.57 | 0.41 | 0.52 | 0.66 | 0.54 | 0.27 | 0.19 | 0.28 |

| | EXAMPLE | | | | | |
|---|---|---|---|---|---|---|
| | 10 | 11 | 12 | 13 | 14 | 15 |
| $SiO_2$ | 68.2 | 68.2 | 68.2 | 68.2 | 68.2 | 62.5 |
| $Li_2O$ | 3.9 | 7.9 | — | — | — | 2.7 |
| $Na_2O$ | 11.8 | 7.9 | 11.8 | 7.9 | 15.7 | 13.4 |
| $K_2O$ | — | — | 3.9 | 7.9 | — | 3.5 |
| CaO | 6.8 | 6.8 | 6.8 | 6.8 | 6.8 | 0.7 |
| $ZrO_2$ | 8.9 | 8.9 | 8.9 | 8.9 | 8.9 | 10.6 |
| $R_2O$ | 15.7 | 15.8 | 15.7 | 15.8 | 15.7 | 16.9 |
| $Na_2O + K_2O - CaO$ | 5.0 | 1.1 | 8.9 | 9.9 | 6.8 | 16.2 |
| $TiO_2$ | — | — | — | — | — | 3.5 |
| $Li_2O/R_2O$ | 0.248 | 0.500 | — | — | — | 0.159 |
| $K_2O/R_2O$ | — | — | 0.248 | 0.500 | — | 0.207 |
| $T_{log\eta=3}$ (° C.) | 1236 | 1205 | 1297 | 1313 | 1190 | 1241 |
| $T_{liq}$ (° C.) | 1230 | 1320 | 1160 | 1350 | 1190 | 1170 |
| $T_{log\eta=3} - T_{liq}$ (° C.) | 6 | −115 | 137 | −37 | 99 | 71 |
| Properties of the glass | | | | | | |
| Density | 2.73 | 2.73 | 2.74 | 2.72 | 2.72 | 2.83 |
| Young's modulus (GPa) | n.d. | n.d. | n.d. | n.d. | 79.3 | 89.0 |
| ε' at 1 MHz | n.d. | n.d. | n.d. | n.d. | n.d. | n.d. |
| at 10 GHz | n.d. | n.d. | n.d. | n.d. | n.d. | n.d. |
| ε" at 1 MHz | n.d. | n.d. | n.d. | n.d. | n.d. | n.d. |
| at 10 GHz | n.d. | n.d. | n.d. | n.d. | n.d. | n.d. |
| Hydrolytic resistance | | | | | | |
| Na (mol/m³) | n.d. | n.d. | 0.69 | n.d. | 0.90 | 0.79 |
| Na + Li + K (mol/m³) | n.d. | n.d. | 0.75 | n.d. | 0.91 | 0.93 | n.d. = not determined.

Examples 1 to 9 are in accordance with the invention.

Examples 10 to 15 are comparative examples:

the glasses of examples 10, 11 and 13 contain a high proportion of $Na_2O$, $K_2O$ and $Li_2O$ respectively: these glasses cannot be fiberized under the usual fiberizing conditions because they have a ($T_{log\eta=3} - T_{liq}$) value that is zero or negative;

the glass of example 12 contains a high proportion of $Na_2O$: it can be fiberized, especially because it has a suitable $K_2O$ content and a suitable CaO content, but the strands obtained have a low hydrolytic resistance; and examples 14 and 15 correspond to compositions of cement-reinforcing glass strands sold by Saint-Gobain Vetrotex under the name Cem-FIL® and by NEG under the name ARG® respectively. The hydrolytic resistance of these strands remains limited.

The glass strands according to the invention (examples 1 to 9) exhibit excellent hydrolytic resistance compared with the glass strands having a high $Na_2O$ content (example 12) and compared with commercial strands (examples 14 and 15). This is because the observed diffusion of $Na^+$ ions into the aqueous medium is less than with the known strands: the reduction is equal to 38% and 45% in the case of the least resistant strands (example 5 compared with examples 15 and 14, respectively) and is equal to 83% and 85% in the case of the most resistant strands (example 8 compared with examples 15 and 14, respectively).

c) Production of the Composites

Strands composed of 17 μm diameter glass filaments were obtained by attenuating molten glass streams of composition according to examples 1, 4 and 14 and collected in the form of wound packages. Along their path, the filaments were coated with a conventional aqueous size A (as described in comparative example 2 of FR 2 837 818 A) or with a size B suitable for corrosive media (as described in example 1 of FR 2 837 818 A) before being collected into strands containing 400 filaments. The wound packages were dried at 130° C. for 12 hours.

The glass strands were used to form composite sheets containing parallel strands in accordance with the ISO 1268-5 standard. The reinforced resin was an isophthalic polyester resin (reference "Synolite 1717" sold by DSM) to which 1.5 parts of hardener (reference "Trigonox HM", sold by Akzo) per 100 parts of resin by weight were added.

Each sheet contained 50% glass by volume and had a thickness of 3 mm. The sheets were then treated at 80° C. for 2 hours and then at 120° C. for 4 hours in order to accomplish complete crosslinking of the resin.

The following properties were determined on the sheets:
the Young's modulus according to the ISO 14125 standard and the Young's modulus of the glass strand $M_{strand}$ was calculated using the equation:

$$M_{strand}=[M_{sheet}-(M_{resin}\times VF_{resin})]/VF_{glass}$$

in which:

$M_{sheet}$ is the Young's modulus of the strand composite sheet, in MPa;

$M_{resin}$ is the Young's modulus of the resin, in MPa;

$VF_{resin}$ is the volume fraction of the resin in the sheet; and $VF_{glass}$ is the volume fraction of the glass in the sheet.

Hydrolytic Resistance

The sheet was placed in a both of boiling water for 72 hours and, at regular intervals, removed from the bath, drained and weighed. The water uptake of the composite sheet is equal to the percentage of water absorbed by this same sheet over a time interval divided by the square root of the time interval, expressed in hours.

Acid Resistance

The sheets were protected at the edges by a layer of epoxy resin 1 to 2 mm in thickness and then each sheet was placed under a given constant stress, in three-point bending, in an acid solution (1N HCl at 25° C.). The failure time of the composite under the flexural stress conditions (ISO 14125 standard) was measured and the curve of the flexural fracture strength as a function of time plotted. The value of the SC (Stress Corrosion) stress in bending, in MPa, needed to make the composite fail after 100 hours of aging was determined from this curve.

The measured values of the tensile strength and the Young's modulus of the glass strand, and also the hydrolytic resistance and acid resistance, of the composite are given in Table 2 below.

TABLE 2

| | EXAMPLE | | | | | | |
|---|---|---|---|---|---|---|---|
| | 16 | 17 | 18 | 19 | 20 | 21 | 22 |
| Strand | | | | | | | |
| Glass | Ex. 1 | Ex. 4 | Ex. 14 | E-glass | Ex. 1 | Ex. 4 | Ex. 14 |
| Size | A | A | A | A | B | B | B |
| Tensile strength (N/tex) | 0.38 | 0.38 | 0.29 | 0.45 | 0.50 | 0.45 | 0.47 |
| Young's modulus (MPa) | 72500 | 75000 | 71500 | 73000 | 76000 | 76000 | 71500 |
| Composite sheet | | | | | | | |
| Water uptake (%/√time(in h)) | n.d. | n.d. | n.d. | 0.03 | 0.10 | n.d. | 0.16 |
| SC stress (MPa) | 950 | 1000 | n.d. | 200 | 1050 | n.d. | 850 | n.d. = not determined.

The strands according to the invention (examples 16 and 17) coated with size A have a higher tensile strength than the commercial strands (example 18), but this remains below that of the E-glass strands (example 19). The Young's modulus of these strands is higher than the strands of examples 18 and 19.

The composite sheet containing these strands also has a better resistance in acid media than that containing E-glass strands (example 19).

The same strands coated with size B (examples 20 and 21) have a tensile strength equivalent to and a Young's modulus greater than those of the known strands (example 22).

The composite sheets containing the strands according to the invention exhibit better resistance to aqueous and acid media: the water uptake is reduced and the SC stress is improved compared with those obtained with the strands of example 22.

The invention claimed is:

1. A glass fiber reinforced composite material, comprising:
    a matrix material; and
    reinforcing glass fibers, wherein said reinforcing glass fibers are formed from a glass composition comprising:
        67-72 mol % $SiO_2$;
        5-9.5 mol % $ZrO_2$;
        11-15.7 mol % $R_2O$ where $R_2O$ is the sum of $Na_2O$, $K_2O$ and $Li_2O$;
        0-5.5 mol % $Li_2O$;
        2.5-5.5 mol % $K_2O$;
        less than 10 mol % $Na_2O$;
        3-9 mol % CaO;
        less than 0.5% of impurities selected from the group consisting of $Al_2O_3$, $Fe_2O_3$, $Cr_2O_3$, $TiO_2$, MgO, SrO, BaO and $P_2O_5$; and
    wherein said reinforcing fibers are free of F.

2. The glass fiber reinforced composite material of claim 1, wherein the amounts of $Na_2O$, $K_2O$ and CaO satisfy the following relationship:

$$2.5 \text{ mol \%} \leq Na_2O+K_2O-CaO \leq 19.5 \text{ mol \%}.$$

3. The glass fiber reinforced composite material of claim 1, wherein the difference between the forming temperature ($T_{logn}=3$) and the liquidus temperature ($T_{liq}$) of the fibers is at least +10° C.

4. The glass fiber reinforced composite material of claim 1, wherein the matrix material is a cementitious material selected from the group consisting of cement, concrete, mortar, gypsum, slag and compounds formed by the reaction between lime, silica and water.

5. The glass fiber reinforced composite material of claim 1, wherein the matrix material is a thermoplastic selected from the group consisting of polyolefins, polyesters, polyamides, polyurethanes and blends thereof.

6. The glass fiber reinforced composite material of claim 1, wherein the matrix material is a thermoset, selected from the group consisting of polyesters, phenolic resins, epoxy resins, polyacrylics and blends thereof.

7. The glass fiber reinforced composite material of claim 1, wherein the fiber comprises:
    2.5-5.5 mol % $K_2O$; and
    5 to less than 10 mol % $Na_2O$.

8. The glass fiber reinforced composite material of claim 7, wherein the fiber comprises:
    1.5-5.5 mol % $Li_2O$.

9. The glass fiber reinforced composite material of claim 1, wherein the fiber comprises:
    3 to 8.5 mol % CaO.

10. The glass fiber reinforced composite material of claim 1, wherein the $Li_2O/R_2O$ and $K_2O/R_2O$ molar ratios are ≤0.5.

11. The glass fiber reinforced composite material of claim 10, wherein the $Li_2O/R_2O$ molar ratio is ≤0.35.

12. The glass fiber reinforced composite material of claim 10, wherein the $K_2O/R_2O$ molar ratio is ≤0.30.

13. The glass fiber reinforced composite material of claim 1, comprising about 7.5 mol % to 9.5 mol % $ZrO_2$.

14. The glass fiber reinforced composite material of claim 1, wherein said composite has a Stress Corrosion value of at least 900 MPa.

* * * * *